United States Patent [19]

Bainard et al.

[11] 4,155,153
[45] May 22, 1979

[54] METHOD FOR MAKING A SHAFT SEAL HAVING A GUARD OR SCRAPER

[75] Inventors: Dean R. Bainard, Bethel Township, County of York, S.C.; Martin E. Benjamin; George Fedorovich, both of Gastonia, N.C.

[73] Assignee: Garlock Inc., Rochester, N.Y.

[21] Appl. No.: 875,334

[22] Filed: Feb. 6, 1978

[51] Int. Cl.² .................... B23P 19/00; B22D 11/126
[52] U.S. Cl. ............................... 29/469.5; 29/527.1; 264/266; 264/268; 264/276; 425/DIG. 47
[58] Field of Search ........................... 29/527.1, 469.5; 264/266, 268, 276; 425/DIG. 47

[56] References Cited

U.S. PATENT DOCUMENTS

| | | | |
|---|---|---|---|
| 2,982,999 | 5/1961 | Stewart | 29/527.1 |
| 3,004,298 | 10/1961 | Haynie | 425/DIG. 47 UX |
| 3,090,996 | 5/1963 | Reichenbach et al. | 29/527.1 |
| 3,241,845 | 3/1966 | Smith et al. | 264/268 UX |
| 3,341,647 | 9/1967 | Aberle | 264/276 X |
| 3,490,139 | 1/1970 | McKinven | 29/527.1 |
| 3,613,223 | 10/1971 | Bush | 29/527.1 |
| 3,733,155 | 5/1973 | Burke | 425/DIG. 47 X |

Primary Examiner—Charlie T. Moon
Attorney, Agent, or Firm—Schovee & Boston

[57] ABSTRACT

A method for making an annular shaft seal of the type having an elastomeric sealing element bonded to a metal shell having a guard or scraper portion having a sharp I.D. edge, in which the sharp I.D. edge is formed or "pierced" during the molding process simultaneously with the elastomeric sealing element being molded and bonded to the shell.

15 Claims, 3 Drawing Figures

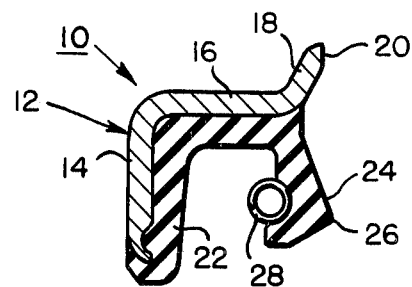
FIG. 1
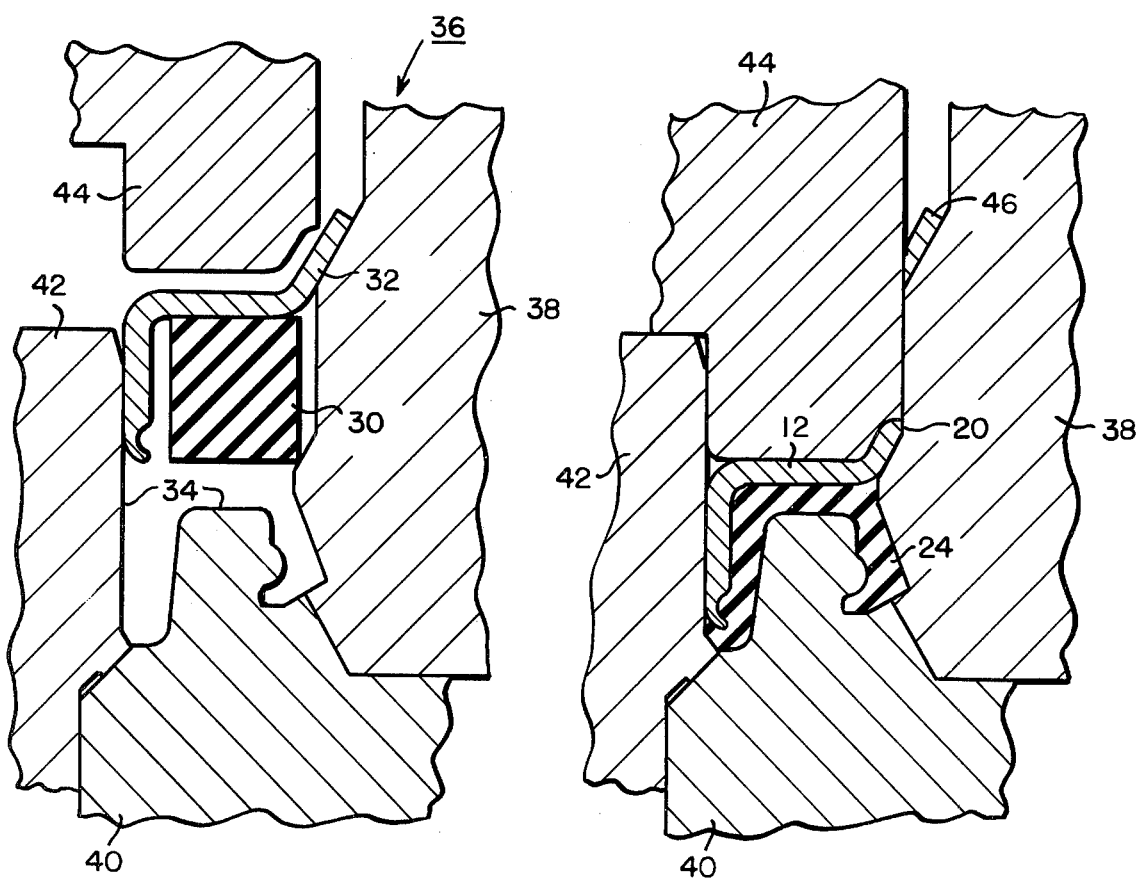
FIG. 2
FIG. 3

METHOD FOR MAKING A SHAFT SEAL HAVING A GUARD OR SCRAPER

BACKGROUND OF THE INVENTION

1. Field of the Invention

This invention relates to annular shaft seals of the type including an elastomeric sealing element bonded to a metal shell having a guard or scraper portion, and in particular to it an improved method for making the same.

2. Description of the Prior Art

Annular shaft seals including an elastomeric sealing element bonded to a metal shell having a guard or scraper portion and generally having the arrangement shown in FIG. 1 are known in the prior art. However, the prior art method for making such a seal requires the three separate steps of: (1) piercing the metal shell prior to molding, (2) carrying out the molding process in which a blank prep form of elastomer is molded to provide a seal body bonded to the shell and having a sealing element with a lip, and (3) then subsequent to the molding process, the previously pierced I.D. edge of the scraper or guard is sharpened in a honing operation.

It is an object of the present invention to provide an improved method for making such a shaft seal which overcomes the problems in the prior art of using three separate steps to produce the sharp I.D. edge of the guard or scraper. It is a further object of the present invention to provide a method for making such a shaft seal in which a sharp I.D. edge of the guard or scraper is produced in a single step simultaneously with the molding step by "piercing" the sharp I.D. edge during the molding operation.

SUMMARY OF THE PRESENT INVENTION

The present invention comprises a method for making an annular shaft seal of the type having an elastomeric sealing element bonded to a metal shell, the shell including a cylindrical portion and a radial flange with a frusto-conical guard or scraper portion with a sharp I.D. edge. The method includes the steps of placing a metal shell and a blank prep form of elastomer in a mold, and closing the mold to simultaneously carry out the steps of molding the blank prep form of elastomer into an elastomeric body having a flexible sealing element with a lip, bonding the elastomeric body to the shell, and piercing the shell to form a sharp annular I.D. edge. The I.D. edge is preferably on a frusto-conical portion which can function as either a guard (with the I.D. edge being spaced away from and out of contact with any shaft extending through the seal) or as a scraper (with the I.D. edge in direct contact with any shaft extending through the seal).

BRIEF DESCRIPTION OF THE DRAWING

The present invention will be more fully understood by reference to the following detailed description thereof, when read in conjunction with the attached drawing, wherein like reference numerals refer to like elements and wherein:

FIG. 1 is a partial cross-sectional view through a shaft seal made according to the present invention; and FIGS. 2 and 3 are cross-sectional views through a mold showing sequential molding steps in the manufacture of the seal of FIG. 1 according to the present invention.

DETAILED DESCRIPTION OF THE PREFERRED EMBODIMENTS

Referring now to the drawing, FIG. 1 shows a seal 10 including a metal shell 12 having a cylindrical portion 14, a radial flange 16 and a frusto-conical portion 18 having a sharp edge 20. The seal 10 further includes an elastomeric body 22 bonded to the shell 12 and having a flexible sealing element 24 with a lip 26. A garter spring 28 can be located in a groove in the sealing element 24 as is known in the art.

The seal 10 of FIG. 1 is made according to the present invention as shown in the sequential molding steps of FIGS. 2 and 3. The seal 10 of FIG. 1 is made according to the present invention by inserting a blank prep form 30 of elastomeric material and a metal shell member 32 into a cavity 34 of a mold 34. The cavity 34 is defined by a core 38, a lower member 40, a centering ring 42, and an upper member 44 which is forced downwardly during the molding operation as will be well understood by those skilled in the art. As the mold is closed, the elastomeric material flows into the desired shape of the elastomeric body 22 having the flexible sealing element 24 with the lip 26 and the elastomeric body 22 is bonded to the shell 12. Simultaneously therewith, the upper member 44 pinches off or pierces the metal shell 32 between the I.D. surface of the upper member 44 which mates with the O.D. surface of the core 38, to create a sharp I.D. edge 20. The cut-off piece 46 (see FIG. 3) of the metal shell member 32 is discarded after the mold is opened. FIGS. 2 and 3 thus illustrate an example of the molding method of the present invention whereby a sharp I.D. edge is formed or pierced in a mold simultaneously with the steps of molding the elastomeric member and bonding it to the shell.

The frusto-conical portion 18 may be designed to function as either a guard or a scraper. When designed to function as a guard, the I.D. edge 20 has a sufficiently larger diameter than that of the lip 26 so that it is adapted to be out of contact with any shaft (not shown) extending through the seal 10. When the frusto-conical member 18 is designed to function as a guard, the I.D. edge 20 can be sharp although this is not always essential. One example of an application in which it is desired that the I.D. edge 20 be sharp is when the seal is used on a propeller shaft on a fishing boat, so that the edge 20 can cut off any fishing line that becomes wrapped around the propeller shaft and which could otherwise possibly enter into the seal causing damage.

When the frusto-conical portion 18 is designed to function as a scraper, the diameter of the I.D. edge 20, in service, is substantially identical to that of the lip 26 so that the edge 20 will contact any shaft extending through the seal 10. Typically, the as-formed diameter of I.D. edge 20 will be from about 0.020 inches to 0.050 inches greater than the diameter of the lip 26, the relative difference increasing as seal diameter increases. When the frusto-conical portion 18 is used as a scraper it is preferred that it be sharp. The piercing operation according to the present invention as shown in FIGS. 2 and 3 does produce a sharp I.D. edge 20.

The preferred material for the shell 12 is brass, because it can be pierced in standard molding operations. However, other materials can be used although the standard molding operation may have to be modified to increase the pressure used. The mating edges of the mold parts that do the piercing are normally of hardened steel and would not need to be modified to pierce most other metals.

When the frusto-conical portion 18 is used as guard rather than as a scraper, spacing of the edge 20 from the shaft surface will vary substantially according to the application requirements. While the present invention has been described with respect to a "shaft" extending through the seal, it is to be understood, and the term "shaft" is hereby defined for use in the present application as including both a rotating and/or reciprocating rod as well as a flexible cable which can be rotating and/or reciprocating. Regarding the I.D. edge 20 being sharp in certain preferred applications, the term "sharp" is hereby defined to mean having a cutting edge. Further, the term "radial" with respect to the radial flange 16 is hereby defined as meaning generally radial and is not limited to a 90° radial flange. The metal shell 10 is shown in the drawing as being ring-shaped (i.e. it already has a hole or central opening therein), however, the shell 10 as inserted into the mold cavity can alternatively be disc-shaped or cup-shaped without any central opening. The piercing step can produce the central opening when it produces the I.D. edge. Further, while the guard or scraper portion is shown as being frusto-conical and extending away from the sealing element, other shapes and directions can be used. Further, the metal of the shell can also be formed or bent as well as pierced.

The invention has been described in detail with particular reference to the preferred embodiments thereof, but it will be understood that variations and modifications can be effected within the spirit and scope of the invention as described hereinabove and as defined in the appended claims.

We claim:

1. A method for making an annular shaft seal of the type having an elastomeric body bonded to a metal shell including a radial flange, said elastomeric body having a flexible sealing element with a lip, said method comprising the steps of:
   (a) placing a metal shell having a radial flange and a blank prep form of elastomer into the mold cavity of a compression mold,
   (b) closing said mold to simultaneously carry out the steps of:
      (i) molding said blank prep form of elastomer into an annular elastomeric body having a flexible sealing element with a lip,
      (ii) bonding said molded elastomeric body to said shell, and
      (iii) piercing said radial flange of said shell to form an annular I.D. edge.

2. The method according to claim 1 wherein said placing step comprises placing a metal shell having a radial flange including a frusto-conical distal end portion, and wherein said piercing step includes piercing said frusto-conical portion.

3. The method according to claim 2 wherein said placing step comprises placing a shell having a frusto-conical portion extending axially away from said radial flange in the opposite direction from that of a cylindrical portion of said shell.

4. The method according to claim 3 wherein said piercing step comprises piercing an annular I.D. edge having a greater diameter than that of said lip, whereby said pierced frusto-conical portion is adapted to function as a guard and to be out of contact with any shaft extending through said seal.

5. The method according to claim 4 wherein said piercing step includes forming a sharp I.D. edge.

6. The method according to claim 5 wherein said molding step comprises molding said flexible sealing element such that it extends axially away from said radial flange in the opposite direction from that of said frusto-conical portion.

7. The method according to claim 4 wherein said molding step comprises molding said flexible sealing element such that it extends axially away from said radial flange in the opposite direction from that of said frusto-conical portion.

8. The method according to claim 3 wherein said piercing step comprises piercing a sharp annular I.D. edge having a diameter slightly larger than that of said lip, whereby the diameter of said I.D. edge will be substantially the same as that of said lip in service, whereby said pierced frusto-conical portion is adapted to function as a scraper in contact with any shaft extending through said seal.

9. The method according to claim 8 wherein said molding step comprises molding said flexible sealing element such that it extends axially away from said radial flange in the opposite direction from that of said frusto-conical portion.

10. A method for making an annular shaft seal of the type having an elastomeric body bonded to a metal shall comprising the steps of:
    (a) placing a metal shell and a blank prep form of elastomer into a mold,
    (b) molding said blank prep form of elastomer into an annular elastomeric sealing element,
    (c) bonding said sealing element to said shell, and
    (d) simultaneously with said molding and bonding steps, piercing said shell to form an annular I.D. edge.

11. The method according to claim 10 wherein said placing step comprises placing into the mold a metal shell having a radial flange with a frusto-conical portion and wherein said piercing step comprises piercing said frusto-conical portion.

12. The method according to claim 11 wherein said piercing step comprises forming a sharp I.D. edge.

13. The method according to claim 11 wherein said placing step comprises placing into said mold a metal shell that is ring-shaped with a central opening therein.

14. The method according to claim 13 wherein said metal shell is brass.

15. The method according to claim 11 wherein said placing step comprises placing into said mold a metal shell that is disc-shaped without any central opening therein.

* * * * *

UNITED STATES PATENT AND TRADEMARK OFFICE
CERTIFICATE OF CORRECTION

PATENT NO. : 4,155,153
DATED : May 22, 1979
INVENTOR(S) : Dean R. Bainard, Martin E. Benjamin, George Fedorovich It is certified that error appears in the above-identified patent and that said Letters Patent are hereby corrected as shown below:

In Claim 10, line 2, delete "shall" and insert therefor --shell--.

Signed and Sealed this

Seventh Day of August 1979

[SEAL]

Attest:

*Attesting Officer*

LUTRELLE F. PARKER
*Acting Commissioner of Patents and Trademarks*